Dec. 21, 1926.

B. A. PETERSON

CORD SPLICING MACHINE

Filed April 28, 1923    9 Sheets-Sheet 1

Inventor:
Burt A. Peterson
By Churchill Parker Carlson
Attys.

Dec. 21, 1926.

B. A. PETERSON

CORD SPLICING MACHINE

Filed April 28, 1923  9 Sheets-Sheet 2

Inventor:
Burt A. Peterson
By Chindahl Parker Taulon
Attys.

Dec. 21, 1926.

B. A. PETERSON 1,611,365

CORD SPLICING MACHINE

Filed April 28, 1923    9 Sheets-Sheet 4

Inventor:
Burt A. Peterson
By Churdahl Parker Parker
Attys.

Dec. 21, 1926.

B. A. PETERSON

CORD SPLICING MACHINE

Filed April 28, 1923    9 Sheets-Sheet 5

Inventor:
Burt A. Peterson
By Churchill Parker Carlson
Attys.

Dec. 21, 1926.

B. A. PETERSON 1,611,365

CORD SPLICING MACHINE

Filed April 28, 1923   9 Sheets-Sheet 9

Patented Dec. 21, 1926.

1,611,365

UNITED STATES PATENT OFFICE.

BURT A. PETERSON, OF ROCKFORD, ILLINOIS, ASSIGNOR TO BARBER-COLMAN COMPANY, OF ROCKFORD, ILLINOIS, A CORPORATION OF ILLINOIS.

CORD-SPLICING MACHINE.

Application filed April 28, 1923. Serial No. 635,244.

This invention relates to mechanism for splicing material wherein a bulky union would be objectionable, as, for example, cords such as are used in pneumatic-tire casings. The object of the invention is to provide a machine for splicing such material reliably and rapidly, and with the least possible effort and attention on the part of the operative.

In the accompanying drawings, Fig. 15 shows the position of the parts during the untwisting operation.

The embodiment herein shown of the invention comprises means for supporting two spools, the cord or thread upon which is to be spliced together; clamps to hold the free ends of the cord on the spools; means to revolve the spools in the direction to take the twist out of the end portions of the cord; and opposed sets of holders for supporting the strands of the two cords, the strands being placed in holders by the operator. These holders are so arranged as to support the strands in pairs, each pair consisting of a strand from each cord. The pairs of strands are supported in parallel relation to one another and are equidistantly spaced. A slide is arranged to move transversely of the pairs of strands, said slide carrying a knotter which is automatically actuated in the travel of the slide to tie each pair of strands together. Means is also provided to take up the slack in the united strands. After the strands have been united, the spools are rotated in the direction to cause the strands to be twisted together, after which the spools are removed from the machine and another pair of spools placed therein in preparation for another cycle of operations.

Figure 1:
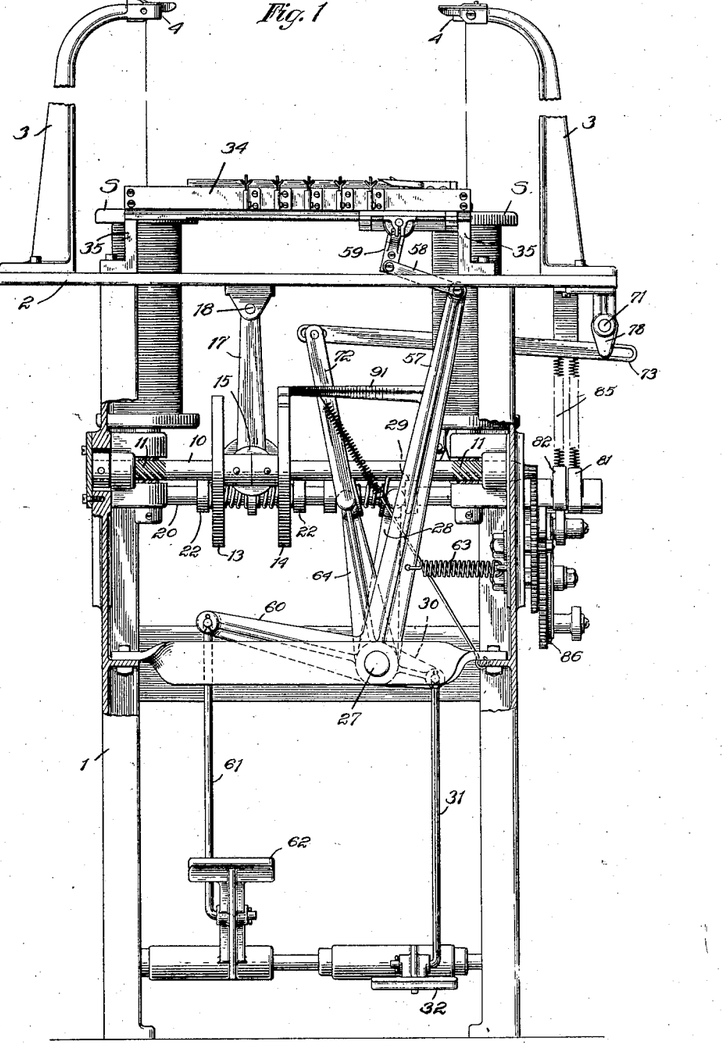
Figure 1 is a fragmental front elevation of a cord-splicing machine embodying the features of my invention, the machine being shown at rest.

Referring now to Figure 1, the main framework of the machine is indicated at 1. The framework comprises a table 2 from which rise two brackets 3 carrying at their upper ends spring clamps 4 of any suitable construction adapted to receive and hold the ends of the cords which are to be spliced.

The spools carrying cords which are to be united are indicated at S. Each spool is mounted upon a spindle 5 supported in vertical position in a bearing 6. The means for connecting the spool to turn with the spindle may be of any suitable character. Herein is shown a transverse pin 7 extending through the lower portion of the spindle and adapted to enter a transverse groove S' (Fig. 11) in one head of the spool. The clamps 4 are alined with the spindles 5.

Means is provided to coact with the clamps 4 in holding the portions of the cords which are to be untwisted, said means consisting, in this instance, of a hook 8 (Figs. 13 and 14) on the upper end of the spindle 5, and a spring-actuated plunger 9 located in the spindle in position to clamp the cord within the hook.

Figure 2:
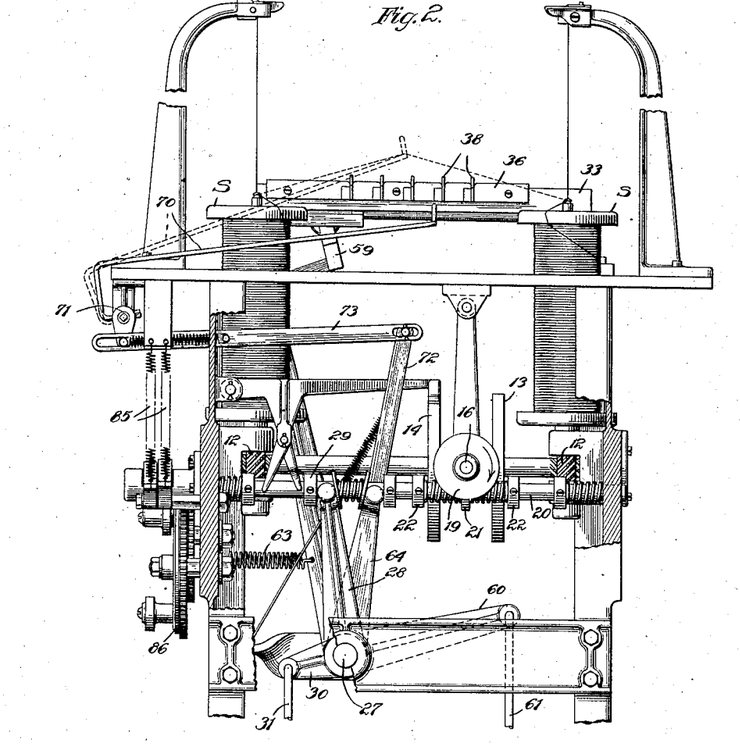
Fig. 2 is a fragmental rear side view with the parts shown at rest.
Figure 5:
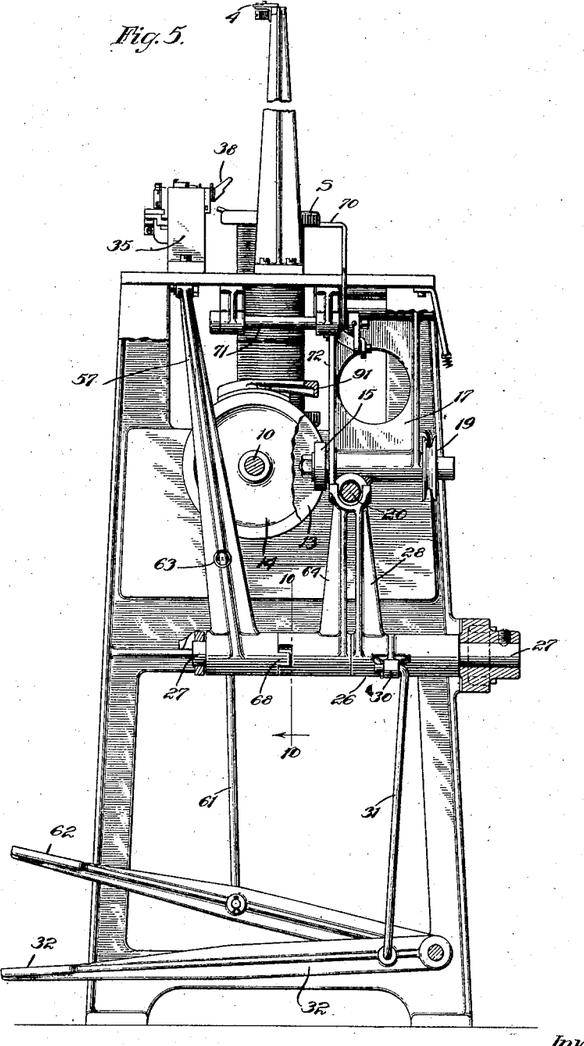
Fig. 5 is a fragmental right-hand elevation of the machine.

The means for rotating the spindles 5 to untwist and twist the strands comprises a shaft 10 (Figs. 1 and 5), said shaft having spiral pinions 11 thereon which mesh with spiral pinions 12 (Fig. 2) on the spindles. Fixed upon the shaft 10 are two friction disks 13 and 14. A friction driving roller 15 is supported between the disks 13 and 14 in such a manner that it may be swung into contact with either of said disks. The shaft 16 upon which the roller 15 is fixed is journaled in an arm or bracket 17 which is pivoted to the lower side of the table 2 at 18. Fixed upon the shaft 16 is a grooved pulley 19 (Fig. 5) adapted to receive a drive belt extending from a suitable source of power. The means for swinging the arm 17 to carry the roller 15 into and out of contact with either of the friction disks 13 and 14 comprises a rod 20 mounted for longitudinal sliding movement in the framework 1. On the lower end of the arm 17 is a lug 21 (Fig. 15) having an opening through which the rod 20 extends freely. Collars 22 are fixed upon the rod 20 at opposite sides of the lug 21, and between each collar 22 and the lug 21 is a helically coiled expansive spring 23 through which the movement of the rod 20 is yieldingly transmitted to the arm 17. Helically-coiled expansive springs 24 interposed between collars 25 and the sides of the main frame 1 tend to hold the rod 20 in a central or neutral position.

The means for moving the rod 20 in the direction to cause the cords to be untwisted comprises a bell-crank lever 26 (Fig. 5) pivotally mounted upon a fixed shaft 27. The arm 28 of the bell-crank lever 26 has a forked upper end adapted to engage a collar 29 on the rod 20. The arm 30 of the bell-crank lever 26 is connected by means of a link 31 to a treadle 32 which is pivoted in the main frame of the machine. When the treadle 32 is depressed, the rod 20 is slid to the right, as viewed in Fig. 1, thereby placing the driving roller 15 in engagement with the friction disk 14, whereby the spindles 5 are rotated in the direction to untwist that portion of each cord which is held between the hook 8 and the clamp 4.

Figures 20, 21, 22, 23:
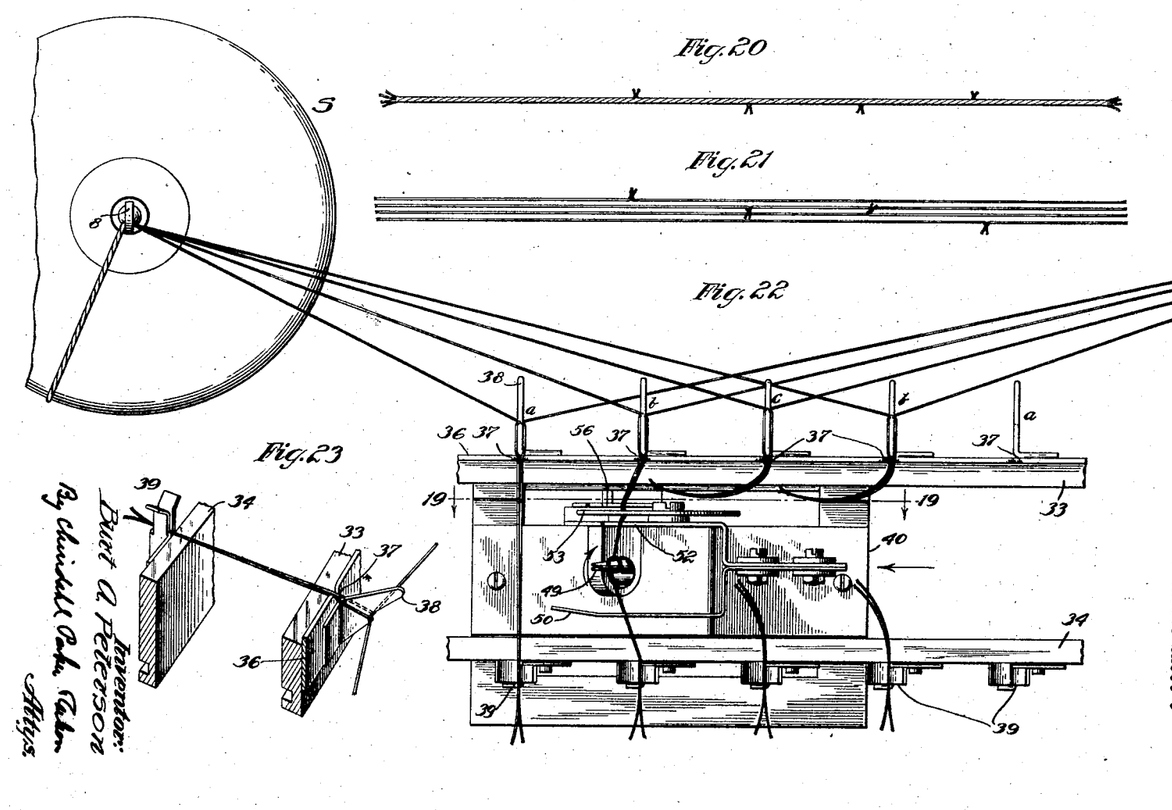
Fig. 20 illustrates the product of the machine.
Fig. 21 shows how the knots are spaced along the spliced cord.
Fig. 22 is a plan view illustrating the operation of uniting the strands.
Fig. 23 is a perspective view of one of the guides and one of the clamps for the strands.

The cords having been untwisted, the operator takes each cord and places the strands thereof in the holders hereinbefore alluded to, these holders comprising a set of guides and a set of clamps best shown in Figs. 22 and 23.

Figures 17, 18, 19:
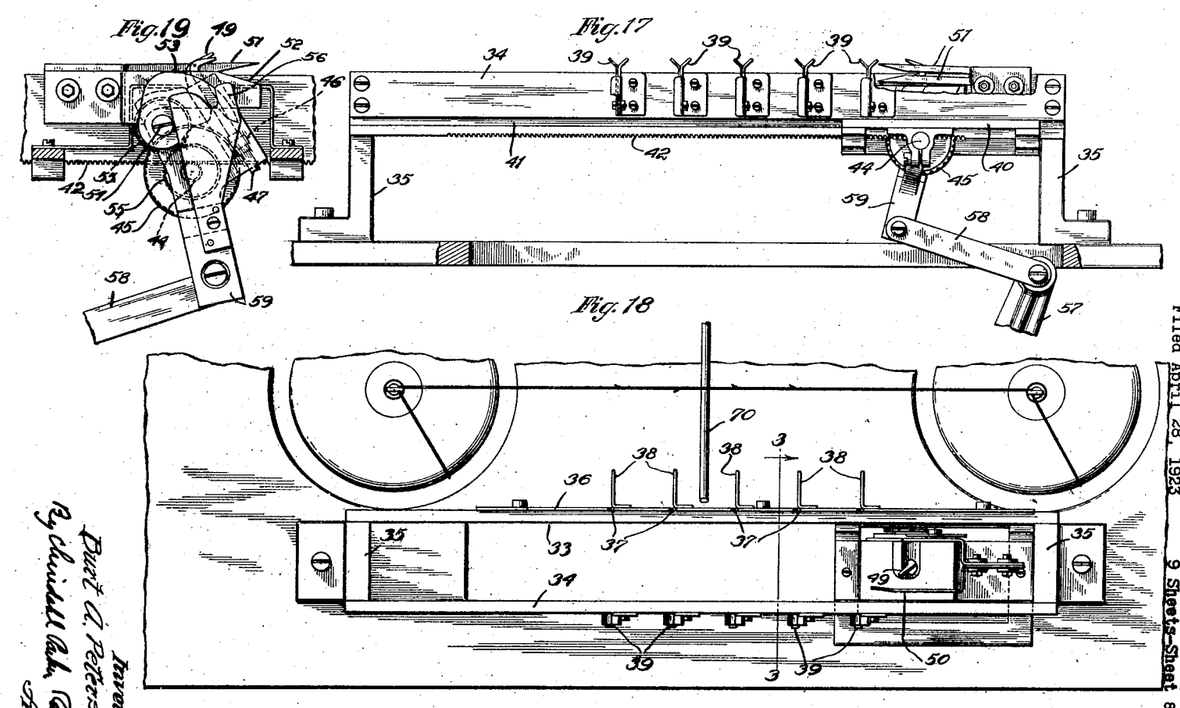
Fig. 17 is a front elevation of the knot-tying mechanism and the guides for the strands.
Fig. 18 is a plan view showing the guides and clamps for the strands, the knot-tying mechanism, and the stripping and tensioning arm.
Fig. 19 is a view taken in the plane of line 19—19 of Fig. 22, illustrating the knot-tying mechanism.

Two horizontal rails 33 and 34 are supported in parallel relation above the table 2 near the forward edge thereof upon brackets 35 (Figs. 17 and 18). To the rear side of the rail 33 is fixed a plate 36 having a plurality of notches 37 in its upper edge, there being five such notches in the present instance which constitute the guides for the pairs of strands.

Figure 3:
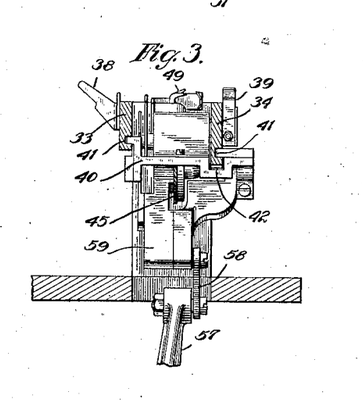
Fig. 3 is a transverse sectional view showing the means for supporting pairs of strands, and the means for uniting said strands.

Projecting rearwardly from the plate 36 are guide fingers 38, each alined with one of the notches 37. The rear edges of these fingers are notched, as indicated in Figs. 3 and 23. Upon the forward side of the rail 34 is secured a series of spring clamps 39, each clamp 39 being directly opposite one of the notches 37. When the cords have been untwisted, the operator arranges the strands of the two cords as shown in Fig. 22. Each strand of one of the cords is led around one of the guide fingers 38, laid in the corresponding notch 37 and drawn into the spring clamp 39 directly opposite said notch. The strands of the other cord are then led around the same guide fingers and placed in the notches 37 and clamps 39, with the result that the strands of the two cords are disposed in pairs extending across the space between the rails 33 and 34, each pair consisting of a strand from each of the cords. Thus the portions of the strands of each pair extending between the guide notches 37 and the clamps 39 are in contact with each other.

The notches in the fingers 38 are formed at such distances from the notches 37 that the several pairs of strands, when united, shall be of approximately the same length. Attention is directed to Fig. 22 where it will be noted that the points $a$, $b$, $c$, $ba$ are not in a straight line, the middle point $c$ being farther away from the path of travel of the knotter than the points $b$, and the latter being farther away from the path of the knotter than the points $a$.

Figure 4:
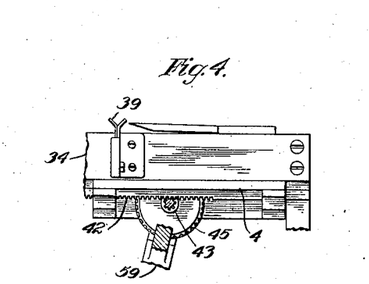
Fig. 4 is a view taken from the right-hand side of Fig. 3.

The knotter is mounted upon a slide 40 supported in guideways 41 (Fig. 3) formed in the rails 33 and 34. The knotter may be of any suitable construction, that herein shown being substantially the same as in the Colman Patent No. 1,029,853 dated June 18, 1912. The knotter is actuated in the travel of the slide 40 by means of a rack 42 on the rail 34. A pinion 43 (Fig. 4) meshing with said rack is rigid with a shaft 44 journalled on the slide. A spiral gear 45 rigidly mounted upon the shaft 44 meshes with a pinion 46 (Fig. 19) on the knotter shaft 47. The upper end of the knotter shaft is provided with a tying bill 49. When the knotter shaft is rotated, the tying bill is opened and closed, as fully explained in said Colman patent.

Suitable means may be employed to support or position the strands relatively to the tying bill. Herein is shown a fork 50 (Fig. 22) consisting of two long tines 51 (Fig. 17), said fork having a flaring throatway. The fork 50 is rigidly mounted upon the slide 40 in position to travel about midway between the tying bill and the series of clamps 39. At the opposite side of the tying bill is a guide plate 52 (Figs. 19 and 22) likewise stationarily mounted on the slide 40 to support a pair of strands in position for action thereon by the tying bill.

As the loops of the knot are being formed, the necessary slack is provided through slippage of the strands through the clamp 39. The knot having been formed and the waste ends trimmed off by the tying bill, the loops of the knot are drawn tight and the knot stripped from the tying bill by means of a stripper hook 53 (Figs. 19 and 22). Said hook revolves upon the axis 54 and is driven from the shaft 44 by means of gear wheels 55, as in the before mentioned Colman patent. The stripper hook 53 rotates in the space between the guide plate 52 and a notched thread guide 56 fixed upon the slide 40.

The means for reciprocating the slide 40 comprises an arm 57 (Fig. 1) pivotally mounted on the fixed shaft 27. The upper end of the arm 57 is connected by means of a link 58 to an arm 59 rigid with the slide 40. An arm 60 rigid with the arm 57 is connected by means of a link 61 to a treadle 62. A contractile spring 63 (Fig. 1) connected to the arm 57 serves to return the slide 40 to the initial or starting position.

The means for rotating the spools is caused to operate in the direction to twist together the several pairs of united strands by means including an arm 64 (Fig. 16) pivotally mounted upon the shaft 27 (Fig. 5) and having a forked upper end to engage a collar 65 fixed on the rod 20. An expansive spring 66 and washers 67 serve to hold the arms 28 and 64 in contact with their respective collars 29 and 65. In order that the arm 64 shall be operable by the treadle 62 and the spring 63, the hub of the arm 57 has two lugs 68 (Figs. 5 and 10) which lie within notches 69 in the hub of the arm 64. The notches 69 are made sufficiently large so that lost motion may occur between the arms 57 and 64 for a purpose to appear hereinafter.

Any suitable means may be employed to strip the united strands from the guide fingers 38 and hold them under tension while the several pairs of strands are being twisted together. Herein I have shown an arm 70 (Fig. 2) which is secured to a shaft 71 journalled in the framework of the machine. The arm 70 is bent so that its free end extends transversely of the united strands and is adapted to be swung up and down in the space between the two spools. The free end of the arm 70 is long enough to extend into the space between two of the guide fingers 38, as shown in Fig. 18, and normally lies below the series of guide fingers 38 so as to be in position to rise into engagement with all of the pairs of strands and strip them free of the guide fingers 38. The means for yieldingly swinging the arm 70 consists, in this instance, of an extension 72 (Fig. 16) of the arm 64, the upper end of said extension being connected to a link 73 by means of a pin 74 lying within an elongated opening 75 in one end of the link. In the opposite end of the link is an elongated opening 76 receiving a pin 77 carried by a crank arm 78 fixed to the shaft 71. A contractile spring 79 is anchored at one end to a pin 80 on the link 73, and is connected at its other end to the pin 77 and normally serves to hold the latter against one end wall of the slot 76.

Figure 6:
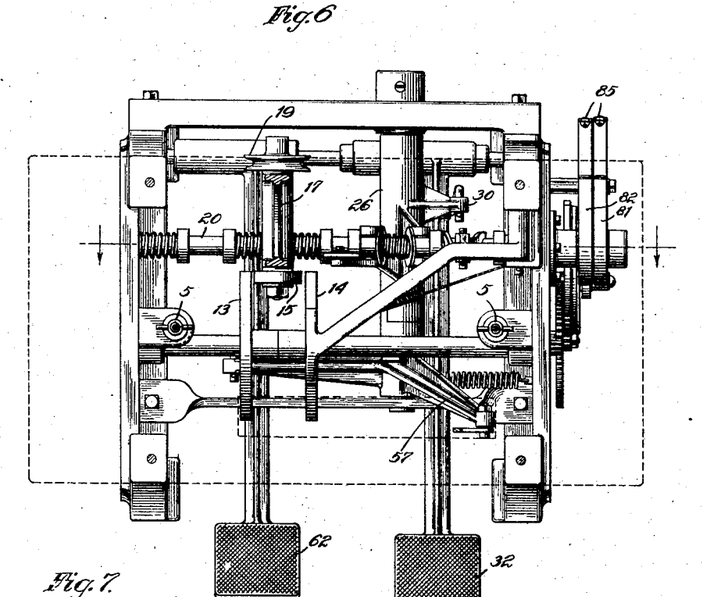
Fig. 6 is a fragmental plan view of the mechanism.
Figure 7:
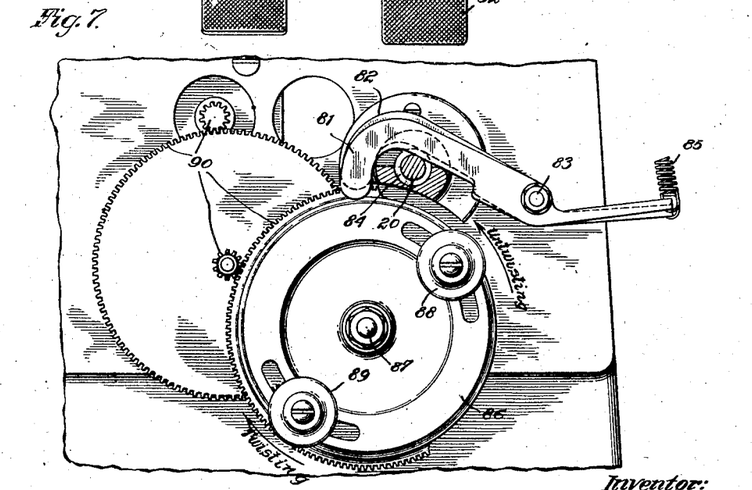
Fig. 7 is a view taken from the right-hand side of Fig. 6, showing the mechanism for operating the untwisting and twisting mechanism for predetermined periods of time.
Figure 16:
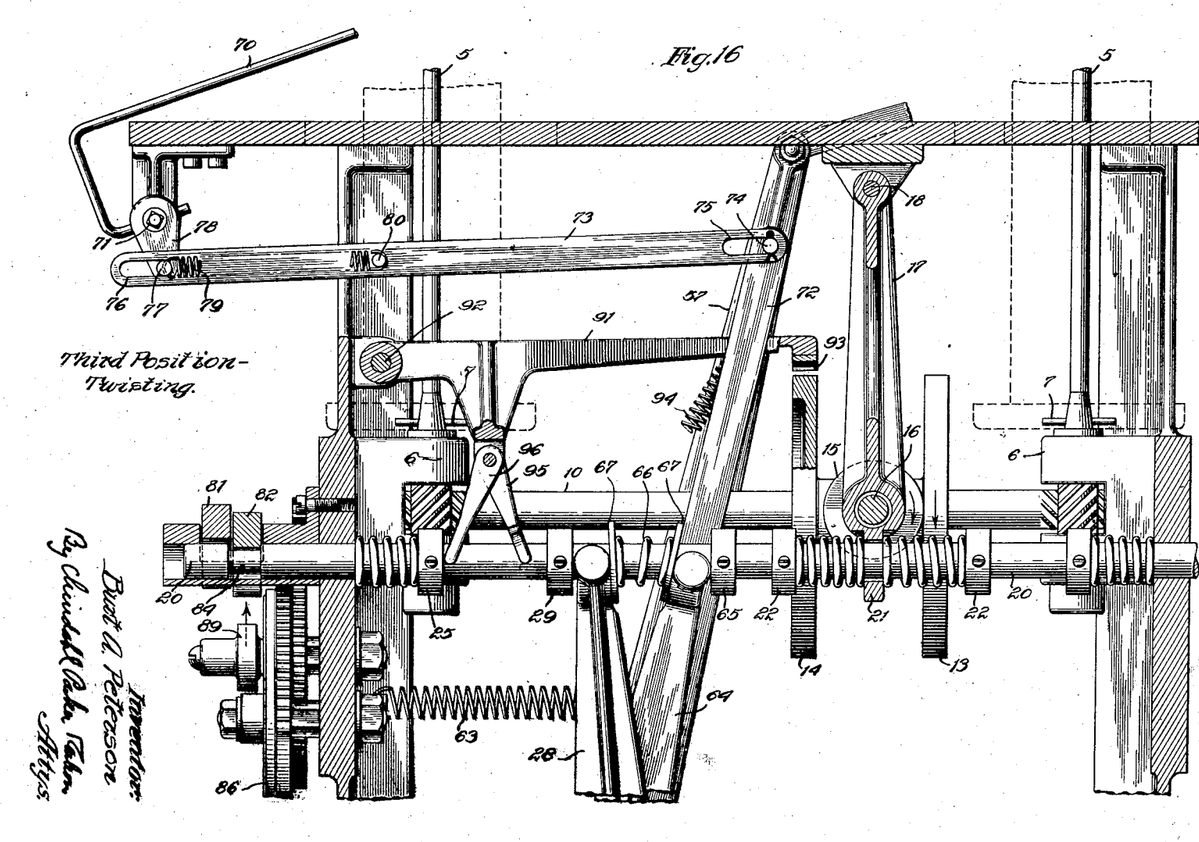
Fig. 16 shows the drive mechanism in the operation of twisting the united strands.

Means is provided for compelling the various mechanisms to be driven in proper timed relation to each other. While various instrumentalities may be used to obtain this result I have herein shown two latches 81 and 82 (Figs. 6 and 7) pivoted to the machine frame at 83. The latches 81 and 82 are arranged side by side and overlie the slide rod 20. The latter has a groove 84 (Fig. 15) formed therein. Tension springs 85 tend to keep the latches 81 and 82 pressed against the rod 20. When said rod is slid to the right to throw in the means for driving the spindles 5 in the direction to untwist the cords, the latch 81 drops into the groove 84 and thus locks the rod 20 in position to continue the untwisting operation as represented in Fig. 15. Similarly, when the rod 20 is slid to the left to cause the pairs of united strands to be twisted, the latch 82 drops into the groove 84 and locks the rod 20 in the twisting position, as shown in Fig. 16.

The means for disengaging the latches 81 and 82 from the rod 20 upon the completion of the untwisting and twisting operations, respectively, may partake of various forms. I have herein shown a disk 86 (Fig. 7) pivotally supported in the machine frame at 87 and carrying two adjustably mounted rollers 88 and 89 adapted to be carried into engagement with the latches 81 and 82, respectively, and thus lift said latches free of the rod 20. The disk 86 is driven from the shaft 10 by means of the gear train 90.

Figures 8, 9, 10, 11, 12, 13, 14:
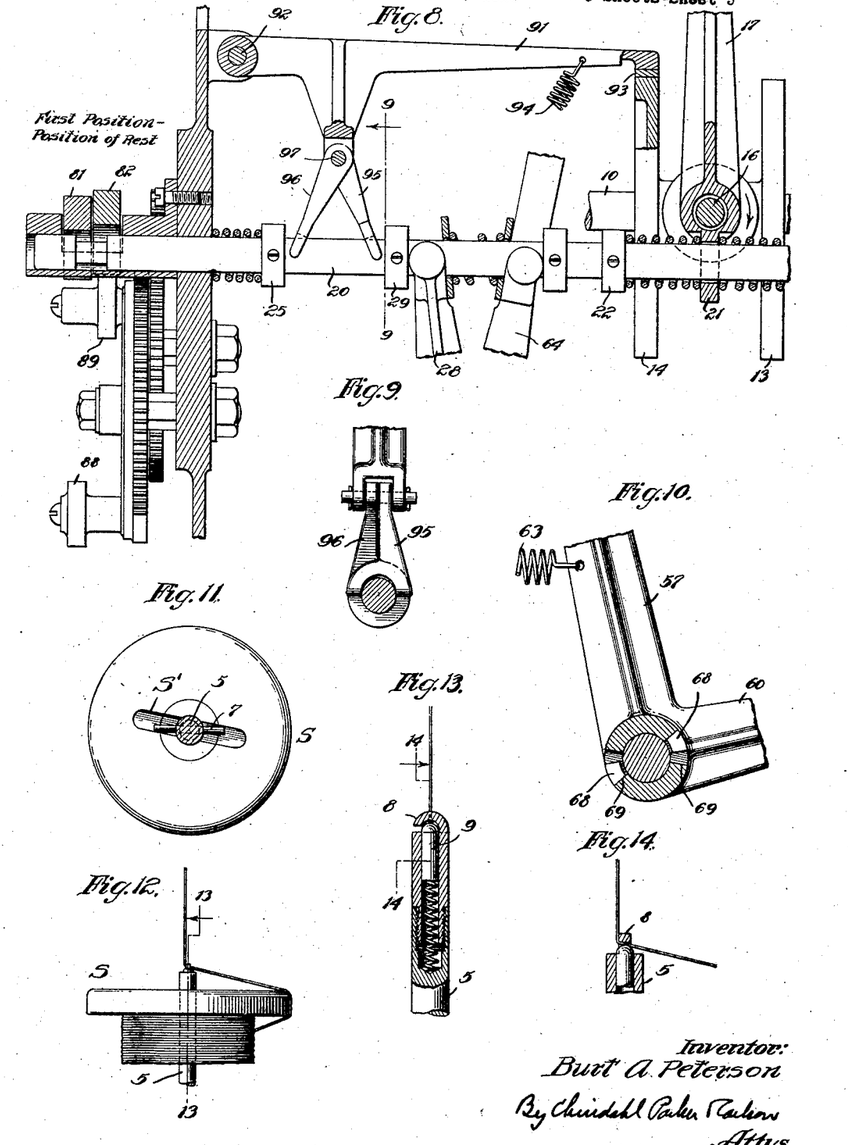
Fig. 8 is a view of the drive mechanism in its position of rest.
Fig. 9 is a view taken on line 9—9 of Fig. 8.
Fig. 10 is a sectional view taken on line 10—10 of Fig. 5.
Fig. 11 is a bottom plan view showing the connection between the spool and its spindle.
Fig. 12 shows the rotary clamp for untwisting and twisting the cord.
Fig. 13 is a view taken in the plane of line 13—13 of Fig. 12.
Fig. 14 is a view taken in the plane of line 14—14 of Fig. 13.
Figure 13:
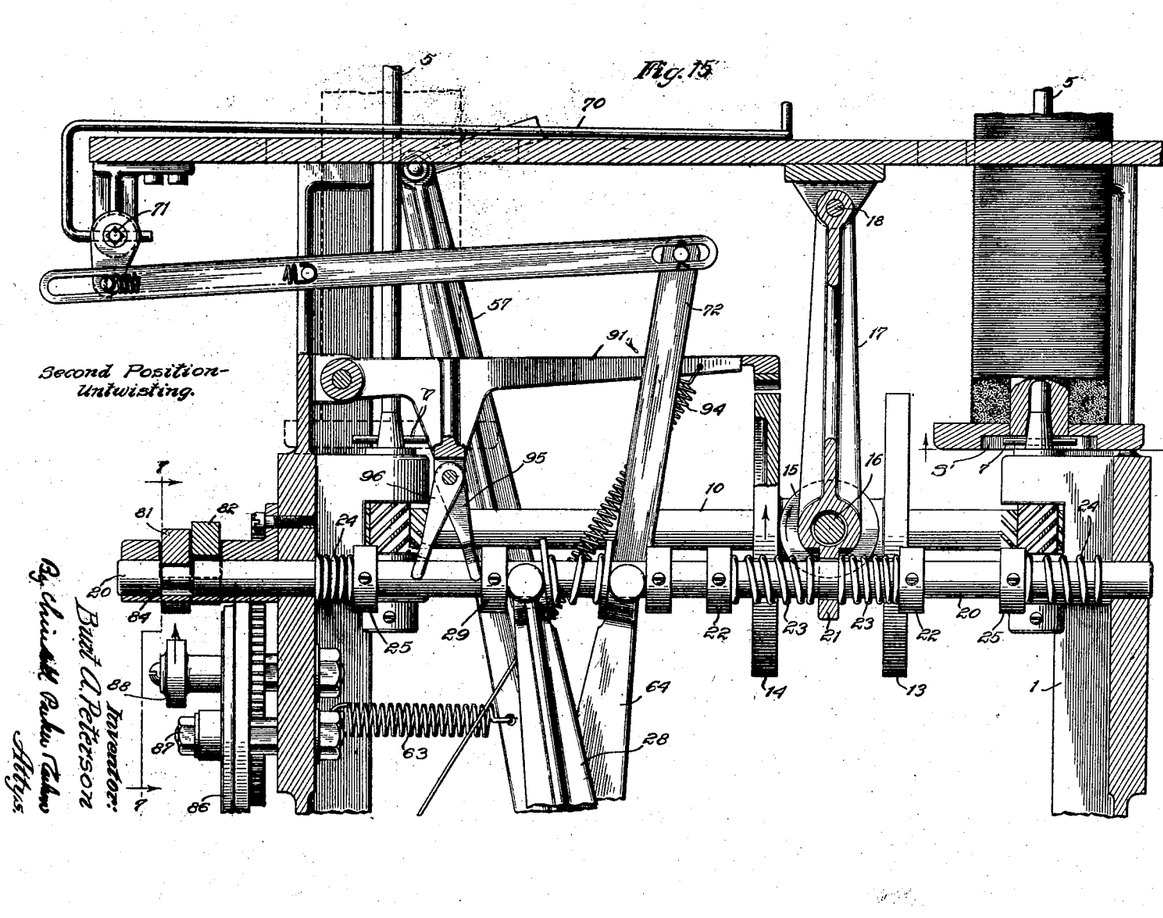

To stop the rotation of the spindles 5 promptly upon the unlatching of the rod 20, I have provided a brake consisting, in this instance, of an arm 91 (Fig. 8) pivoted to the machine frame at 92 and carrying a brake shoe 93 adapted to engage the periphery of the friction disk 14. A contractile spring 94 tends to move the brake arm 91 into engagement with the disk 14. Two forked fingers 95 and 96 are pivotally suspended from the brake arm 91 at 97, the lower ends of said fingers resting upon the slide rod 20 between the collars 25 and 29. When the machine is at rest, as shown in Fig. 8, the fingers 95 and 96 are free of the collars 25 and 29, and the spring 94 is free to hold the brake shoe 93 pressed against the disk 14. When the slide rod 20 is moved into the position shown in Fig. 15, to cause the cords to be untwisted, the collar 29 engages the fingers 95 and swings said finger toward a vertical position, thus forcing the brake arm 91 up against the tension of the spring 94. When the rod 20 is moved in the opposite direction to cause the pairs of strands to be twisted, the collar 25 engages the finger 96 and causes the shoe 93 to be lifted from the disk 14.

The mode of operation is as follows:

Fig. 1 shows the machine at rest. The operative has placed therein two spools S, the cords of which are to be spliced together and has placed the ends of the cords in the clamps 4, the cords also having been slipped into the clamps 8, 9 (Fig. 13). The operative then depresses the treadle 32, thereby placing the parts in the position shown in Fig. 15, the drive for the spindles 5 being locked in operative position by the latch 81. By the time the length of cord held between the clamps 9 and 4 has been untwisted, the roll 88 has disengaged the latch 81 from the slide rod 20, whereupon the spring 24 places said rod in neutral position and the brake causes the mechanism to stop. The operative then takes one of the cords and lays the strands thereof in the notches 37 and clamps 39, as shown in Fig. 22. The operative then lays the strands of the other cord in the same set of notches and clamps. The operative then depresses the treadle 62, thereby causing the knotter slide 40 to travel transversely of the pairs of strands held in the notches 37 and clamps 39, the knotter operating to tie together the strands of each pair. The arm 57 is connected to the arm 64 through the lost-motion connection illustrated in Fig. 10; consequently, after the arm 57 has swung far enough to cause all of the pairs of strands to be tied, the finger 70 is caused to strip the strands from the notches 37 and fingers 38 and hold them under tension, and the spindle drive is thrown into position to cause the strands to be twisted together. By the time the twisting of the united strands has been effected, the roller 89 has disengaged the latch 82 from the slide rod 20, whereupon said rod assumes its neutral position, and the brake 93 checks the rotation of the spindle. The operator then removes the united spools from the machine.

The knots tied by the machine are small and the ends are trimmed off short and to a uniform length. As shown in Figs. 20 and 21, the knots are distributed along the spliced cord, so that the splice is free from any objectionable bunchiness.

As indicated in Fig. 22, there are five sets of guide fingers 38 and clamps 39, the machine being therefore capable of operating on cord having as many as five strands. It will be understood that the machine may be readily adapted to splice material containing more than five strands.

The invention is not limited to use with any particular class of material. For the sake of brevity, the term "cord" has been used in the following claims to designate any stranded material to be united by a splicing operation, and the word "spool" has been employed to denote any suitable container for such material or a mass of such material. The word "strand" is used to denote any suitable subdivision of the cord; for example, in an eleven-ply cord, four of the "strands" would be composed of two threads each, while the other "strand" would consist of three threads.

I claim as my invention:

1. A cord-splicing machine having, in combination, two spindles each for supporting and rotating a spool, a clamp on each spindle, stationary means to hold cords held by the spindle clamps, means to support a series of pairs of strands equidistantly spaced apart, a knotter arranged to travel along the series to unite the strands, an arm adapted to strip the united strands from said supporting means and hold them under tension, mechanism for revolving the spindles in opposite directions and for actuating said arm, a treadle for causing said spindles to untwist cords held in said clamps, and a treadle for actuating the knotter and for causing said mechanism to actuate said arm and drive said spindles in the direction to twist up the united strands.

2. A cord-splicing machine having, in combination, two spindles each for supporting and rotating a spool, a clamp on each spindle, stationary means to hold cords held by the spindle clamps, means to support a series of pairs of strands equidistantly spaced apart, a knotter arranged to travel along the series to unite the strands, mechanism for revolving the spindles in opposite directions, a treadle for causing said mechanism to drive said spindles in the direction to untwist cords held in said clamps, and a treadle for actuating the knotter and for causing said mechanism to drive said spindles in the direction to twist up the united strands.

3. A cord-splicing machine having, in combination, two rotary cord clamps, stationary means to hold cords held by the rotary clamps, means to support a series of pairs of strands equidistantly spaced apart, a knotter arranged to travel along the series to unite the strands, mechanism for revolving the rotary clamps in opposite directions, a treadle for causing said mechanism to drive said rotary clamps in the direction to untwist cords held in said clamps, and a treadle for actuating the knotter and for causing said mechanism to drive said rotary clamps in the direction to twist up the united strands.

4. A cord-splicing machine having, in combination, two rotary cord clamps, stationary means to hold cords held by the rotary clamps, means to support a series of pairs of strands equidistantly spaced apart, a knotter arranged to travel along the series to unite the strands, mechanism for revolving the rotary clamps in opposite directions, a treadle for causing said mechanism to drive said rotary clamps in the direction to untwist cords held in said clamps, and a treadle for causing said mechanism to drive said rotary clamps in the direction to twist up the united strands.

5. A cord-splicing machine having, in combination, two rotary cord clamps, stationary means to hold cords held by the rotary clamps, means to support a series of pairs of strands equidistantly spaced apart, a knotter arranged to travel along the series to unite the strands, and means for revolving the rotary clamps in the direction to untwist cords held in said clamps, and in the direction to twist up the strands after they have been united.

6. A cord-splicing machine having, in combination, two cord clamps, a series of guides extending between and in front of said cord clamps, a series of strand clamps extending along and in front of the series of guides, each strand clamp being opposite one of the guides and being adapted to receive a pair of strands, one extending from each cord clamp, said guides serving to guide the strands to said strand clamps, a knotter arranged to travel transversely of the pairs of strands supported by said strand clamps and guides and unite the strands of each pair, means to strip the united strands from said guides and hold them yieldingly under tension, and means to revolve the cord clamps to twist the united strands together.

7. A cord-splicing machine having, in combination, two cord clamps, a series of guides extending between and in front of said cord clamps, a series of strand clamps extending along and in front of the series of guides, each strand clamp being opposite one of the guides and being adapted to receive a pair of strands, one extending from each cord clamp, said guides serving to guide the strands to said strand clamps, a knotter arranged to travel transversely of the pair of strands supported by said strand clamps and guides and unite the strands of each pair, and means to revolve the cord clamps to twist the united strands together.

8. A cord-splicing machine having, in combination, two spindles for supporting and rotating spools, a cord clamp on each spindle, stationary clamps to hold cords held by the spindle clamps, a shaft geared to both spindles, two friction disks on said shaft, a friction driving roller between said disks, a treadle for moving said roller into engagement with one of said disks, and a treadle for moving the roller into engagement with the other disk.

9. A cord-splicing machine having, in combination, two spindles for supporting and rotating spools, a cord clamp on each spindle, stationary clamps to hold cords held by the spindle clamps, a shaft geared to both spindles, two friction disks on said shaft, a friction driving roller between said disks, and means under the control of the operator for moving said roller into engagement with either of said disks.

10. A cord-splicing machine having, in combination, two rotary cord clamps, stationary clamps to hold cords held by the rotary clamps, a shaft connected to drive the rotary clamps, two friction disks on said shaft, a friction driving roller between said disks, and means under the control of the operator for moving said roller into engagement with either of said disks.

11. A cord-splicing machine having, in combination, means to twist and untwist the cords which are to be spliced, a drive for said untwisting and twisting means, means to throw in the drive to cause untwisting of the cords, means to throw in the drive to cause twisting of the cords, means tending to throw out the drive, means to lock the drive in its throw-in positions for predetermined periods of time, and means operable to stop said twisting and untwisting means upon the throwing out of said drive.

12. A cord-splicing machine having, in combination, means to twist and untwist the cords which are to be spliced, a drive for said untwisting and twisting means, means including a slide rod to throw in the drive to cause untwisting or twisting of the cords, a spring for placing said rod in central neutral position, and means to lock said rod in its thrown-in positions for predetermined periods of time.

13. In combination, a series of equidistant clamps each adapted to hold a pair of elements to be united, a series of equidistant guides for said pairs of elements, each guide being opposite one of said clamps, and a knotter arranged to travel transversely of the series of elements and unite the elements composing each pair.

14. In combination, a series of clamps each adapted to hold a pair of strands, a guide for each pair of strands, and a knotter arranged to engage each pair of strands between the clamp and guide and unite them.

15. In a cord-splicing machine, two rotary cord clamps and strand-supporting means comprising a series of clamps for pairs of strands extending from said cord clamps, a guide plate extending along said series of clamps and having a notch opposite each clamp, and a guide finger at each notch, said guide finger extending away from said plate and said strand clamps, said finger having a strand-receiving notch in its farther edge.

16. In a cord-splicing machine, two rotary cord clamps and means to support strands extending from said clamps, said means comprising a series of clamps for pairs of strands, a guide plate extending along said series of clamps and having a notch opposite each clamp, and a guide finger at each notch.

17. In combination, two cord clamps, a series of guides extending between and in front of said cord clamps, a series of strand clamps extending along and in front of the series of guides, each strand clamp being opposite one of the guides and being adapted to receive a pair of strands, one extending from each cord clamp, said guides serving to guide the strands to said strand clamps.

18. In a cord-splicing machine, strand-supporting means comprising a series of clamps for pairs of strands, a guide plate extending along said series of clamps and having a notch opposite each clamp, and a guide finger at each notch, said guide finger extending away from said plate and said clamps, said finger having a strand-receiving notch in its farther edge.

19. In a cord-splicing machine, strand-supporting means comprising a series of clamps for pairs of strands, a guide plate extending along said series of clamps and having a notch opposite each clamp, and a guide finger at each notch.

20. In a cord-splicing machine, strand-supporting means comprising a plurality of clamps for pairs of strands, and guide means opposite each clamp having a notch and a guide finger at the notch.

21. In a cord-splicing machine, a rotary spindle having a transverse pin extending through its lower portion adapted to enter a transverse groove in one head of a spool, and a cord clamp on the other end of said spindle at a point beyond the other head of the spool.

22. In a cord-splicing machine, a rotary spindle having means at its lower portion to engage one head of a spool to prevent rotation of the spool on the spindle, and a cord clamp on the other end of said spindle at a point beyond the other head of the spool.

23. A cord-splicing machine having, in combination, mechanism for twisting and untwisting the cords to be spliced, driving means for said mechanism, means to throw in said driving means to cause twisting or untwisting of said cords, and a brake for stopping said twisting and untwisting mechanism.

24. A cord-splicing machine having, in combination, mechanism for twisting and untwisting the cords to be spliced, driving means for said mechanism, braking means normally holding said mechanism at rest, and means to release said braking means and to connect said driving means with said mechanism to cause twisting or untwisting of said cords.

25. A cord-splicing machine having, in combination, two clamps for holding the cords to be spliced, means for supporting a series of pairs of strands to be united, one strand of each pair extending from each of said cord clamps, and means to strip said strands from said supporting means after they have been united and yieldingly hold them under tension.

26. The combination of a series of pairs of holders in each of which pairs of holders a pair of cords or strands may be manually positioned, a knotter, means for guiding the knotter to travel along the series of holders and transversely of the pairs of cords, a rack extending along the series of holders, and a pinion meshing with the rack and connected to the knotter for actuating the latter in invariable timed relation to the pairs of cords to unite the cords constituting each pair.

27. The combination of a series of pairs of holders in each of which pairs of holders a pair of cords or strands may be manually positioned side by side, a knotter, means for guiding the knotter to travel transversely of the pairs of cords, and means for actuating the knotter in invariable timed relation to the pairs of cords to unite the cords constituting each pair.

28. In a machine of the character described, strand-supporting means comprising a plurality of clamps for pairs of strands, and guide means providing a notch opposite each clamp.

29. In a machine of the character described, strand-supporting means comprising clamps for a plurality of strands, and a guide means providing a notch opposite each of said clamps.

In testimony whereof, I have hereunto affixed my signature.

BURT A. PETERSON.